United States Patent

[11] 3,584,710

| [72] | Inventor | Gunter Frohlich<br>Amselweg 27, Ennepetal-Voerde, Germany |
|---|---|---|
| [21] | Appl. No. | 801,036 |
| [22] | Filed | Feb. 20, 1969 |
| [45] | Patented | June 15, 1971 |
| [32] | Priority | Mar. 1, 1968 |
| [33] | | Germany |
| [31] | | P 16 75 145.4 |

[54] ELECTROMAGNETICALLY RELEASABLE DRUM BRAKE WITH INTERNAL SHOES
11 Claims, 5 Drawing Figs.

[52] U.S. Cl. ............................................. 188/171, 188/216
[51] Int. Cl. ............................................. B60t 13/04
[50] Field of Search ............................................. 188/171, 216

[56] References Cited
UNITED STATES PATENTS
2,166,157   7/1939   Jones et al. .................. 188/216 UX OTHER REFERENCES
1,227,287, 10-1966, German printed application, Frohlich, 188/171

Primary Examiner—George E. A. Halvosa
Attorney—Stevens, Davis, Miller & Mosher

ABSTRACT: An electromagnetically releasable drum brake with long life internal shoes in which the effects of premature wear of individual brake linings are eliminated. The brake has an annular magnetic body on which are mounted leaf springs extending in the direction of the periphery of the magnetic body. These springs carry on their ends armatures cooperating with the magnetic bodies as well as a brakeshoe. The armatures are centrally mounted and act as stroke limiting means for the brakeshoes. They form a single element together with the fixing means for the leaf springs and are secured at the fixing point of the leaf springs.

Inventor
Gunter Frohlich

Inventor
Gunter Frohlich

Stevens, Davis, Miller & Mosher

Attorneys

ELECTROMAGNETICALLY RELEASABLE DRUM BRAKE WITH INTERNAL SHOES

The invention relates to an electromagnetically releasable drum brake with internal brakeshoes, comprising an annular magnetic body on which leaf springs, extending in the direction of the periphery of the magnetic body, are mounted centrally. The springs carry on their free ends armatures which cooperate with the magnetic body and brakeshoes, and act as stroke limiting means for the brakeshoes.

An already published proposal of the applicants (German published specification No. 1,227,287) describes an electromagnetically releasable drum brake with internal shoes, comprising an annular magnetic body with which several magnetic armatures carrying brakeshoes collaborate. The shoes are pressed each by the force of a spring against the brake drum when the magnetic body is deenergized. The springs carrying the brakeshoes are leaf springs extending along the periphery of the magnetic body. They are mounted thereon either from one side or centrally and each carry on their free shaft a magnetic armature with a brakeshoe. Owing to the one-sided or central mounting of the springs and the peripherally arranged brakeshoes, the latter are positioned obliquely to the drum brake so that during operation there occurs is presented a steadily increasing wearing surface. Since this necessarily causes the resulting contact pressure force to move towards the fixing point of the spring, the effective spring lever arm becomes shorter, and the resulting decrease in the spring bias is equalized by a larger contact pressure force.

Since the brake linings and springs are conveniently so constructed that they have the same mechanical properties inside the brake, theoretically the same useful life may be assumed for all brakeshoes. However, in brakes there are unavoidable differences, for example due to unequal material properties of brakeshoes and magnetic armatures, uneven spring bias, etc., which result in uneven wear of the brakeshoes so that they do not all reach the end of their useful life simultaneously. In order to avoid damage to the brake drum by premature wearing of a brakeshoe, it has been proposed to fit stroke limiting pins between the adjacent free ends of the leaf springs carrying the magnetic armatures of the brakeshoes. Thus, if one of the brakeshoes wears prematurely it abuts on these stroke limiting pins during the residual active life of the other brakeshoes, that is to say until the whole brake is changed. These prior art stroke limiting pins consist of special brass screws with a flange-shaped edge, a cross section of which must be as small as possible in order to leave as much space as possible for the brake linings. It has now been shown that the life of such a brake with internal brakeshoes is in fact frequently limited by the premature wear of a single brakeshoe. The reason is that once engagement between the brakeshoe and the brakedrum no longer takes place, this brakeshoe abuts against the brake limiting pin for the rest of its useful life, e.g., 100,000 times. The stroke limiting pins are generally incapable of withstanding this load, are destroyed, the prematurely worn brakeshoe then again makes contact with the brakedrum and causes damage thereto.

It is also often convenient to provide an auxiliary release device for internal jaw brakes of this type. According to another published proposal of the applicants (German published specification No. 1,255,408 ) there is provided to this end a cable surrounding the brakeshoes which, when the cable is shortened, pulls the brakeshoes off the brakedrum, and thereby releases the brake. If this auxiliary release device for the brakeshoes is arranged between the individual springs, this necessarily interferes with the identical construction of all springs, and results in an uneven useful life of the brakeshoes.

The present invention has an object an electromagnetically releasable brake with internal brakeshoes in which the springs, and the associated auxiliary equipment such as the stroke limitors, auxiliary release device and the like, are so arranged so as to produce as uniform as possible a wear of all brakeshoes and thereby a substantially longer useful life of the brake. According to the invention this object is realized in that guide elements for limiting the stroke and/or guiding are arranged at the mounting position of the leaf springs. Conveniently the guide element has, with center mounted leaf spring, two arms projecting in the peripheral direction and extending over the whole width of the magnetic body and in the direction of the periphery, partially over the magnetic armatures at the end of the leaf springs.

Further features and advantages of the invention will become apparent from the following description with reference to the accompanying drawings and from the appended claims. In the drawings:

Figure 1:
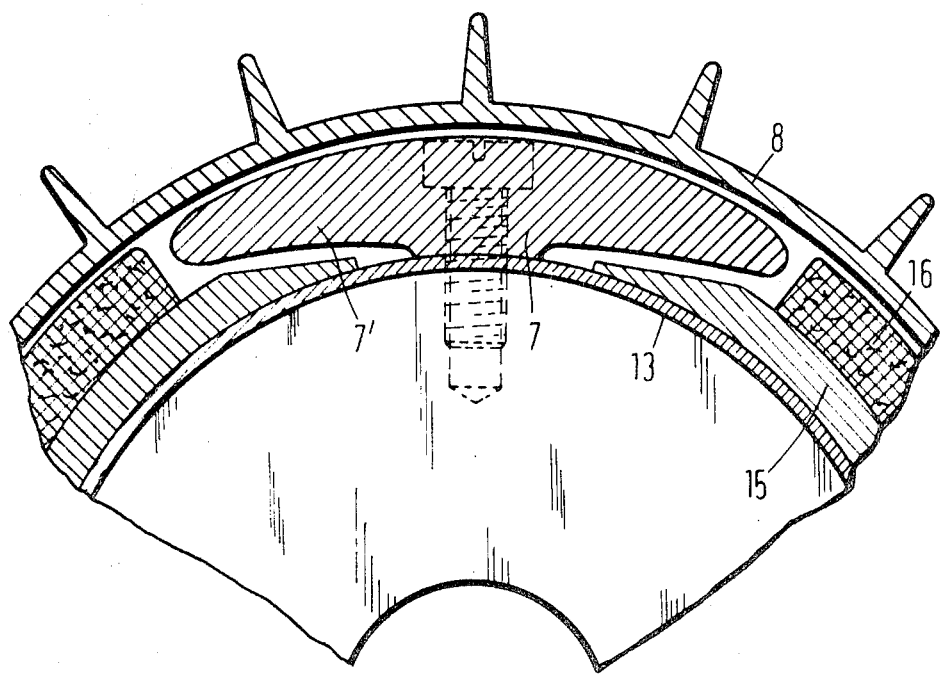
FIG. 1 is an end view, partly in section, of an open drum brake with internal shoes according to the invention.
Figure 2:
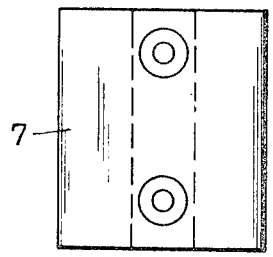
FIG. 2 is a top view of a limiting and guide element according to FIG. 1.

An annular magnetic body 2 is mounted on the flange of an electric motor, not shown. This magnetic body 2 is provided with an annular groove 3 (FIG. 3) on both sides of which are arranged pole shoes 4 and 5. The groove 3 is adapted to receive a field coil (not shown). A brakedrum 8 is mounted on the shaft of an electric motor. Several leaf springs 13 are attached at their centers to the periphery of the magnetic body 2. These leaf springs 13 extend in the direction of the periphery of the magnetic body 2 and carry at each end a magnetic armature 15 and a brakeshoe 16.

The leaf springs 13 are retained at their centers by screws which simultaneously retain a limiting element 7 which has a mushroom-shaped cross section. The laterally projecting arms 7' of the element 7 extend to near the brakeshoes 16 and partially over the magnetic armatures 15. Preferably the member 7 is made of a nonmagnetizable material such as brass. In the embodiment shown in FIG. 1 the laterally extending arms 7' have such a cross section that a force acting on the outermost end is uniformly distributed over the whole element 7 and excessive loads at certain points are prevented. The end of the magnetic armature underneath the arms of the element 7 is chamfered in the direction of the secured point of the spring. This serves not only to produce a clean contact between the magnetic armatures 15 and the laterally projecting arms 7' of the element 7, but results also in an advantageous shift of the magnetic flux in the direction of the leading ends of the leaf springs. It has been shown that due to the necessarily very narrow gap formed between the ends of the magnetic armatures 15 near the spring fixing point with the annular magnet, there occurs at this point, when the annular magnet is energized practically a short circuit of the magnetic flux. Consequently, the residual magnetic force available encounters because of its smaller mounting, a certain delay in the release of the brakeshoes during the starting the electric motor. Due to the chamfer provided at the inner ends of the brakeshoes 16, the magnetic saturation limit is very quickly reached and the magnetic flux flows mainly through the zones of larger cross section of the magnetic armature 15, so that practically the full magnetic force is available.

Figure 3:
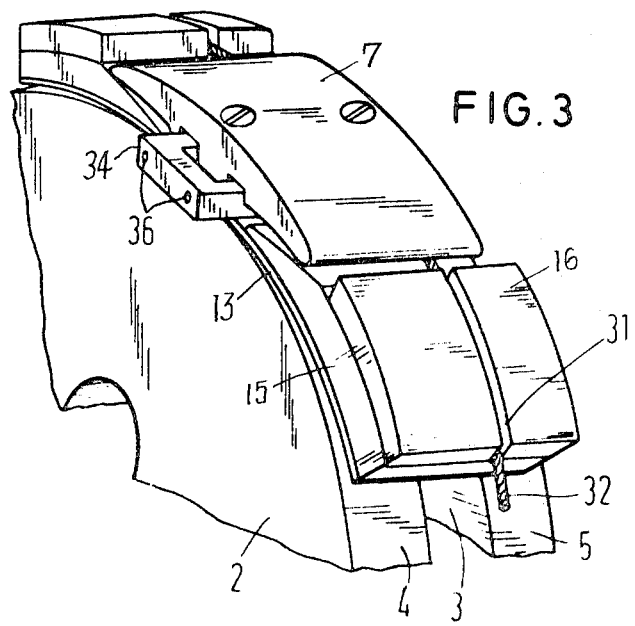
FIG. 3 is a view in perspective of a drum brake with internal brakeshoes, similar to FIG. 1 but with auxiliary release device.

FIG. 3 shows a further embodiment of a brake with internal brakeshoes, comprising an auxiliary release device for the brakeshoes. The brakeshoes 16 have each a groove 31 extending in the direction of the periphery in which is mounted a steel cable 32 extending over the whole circumference of the magnetic body 2. The steel cable 32 passes under the guide element 7 which is provided with a correspondingly peripherally extending groove.

Figure 4:
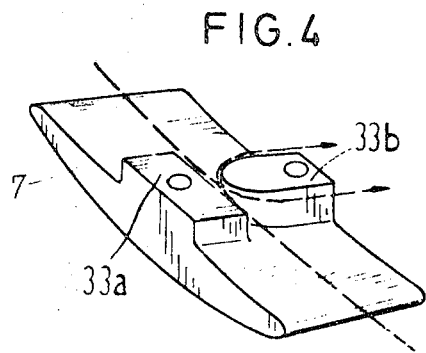
FIG. 4 is a perspective view of a stroke limiting and guide element for a drum brake with internal shoes according to FIG. 3.
Figure 5:
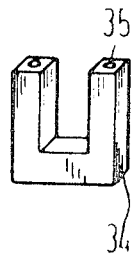
FIG. 5 shows a cable nipple for the internal shoe brake of FIG. 3.

In the brake according to FIG. 3 at least one of the guide elements 7 is constructed as shown in FIG. 4. This element 7 has as support on the leaf spring 13 a leg 33, divided into two parts 33a and 33b by the groove which receives the steel cable 32. The part 33b of the leg 33 is, viewed in the direction of the circumference of the brake, substantially narrower than the part 33a. Its side faces serve as guides for a U-shaped nipple 34, shown in FIG. 5, which is displaceable axially when the guide element 7 is fixed on the body 2 (see FIG. 3), whilst its end face facing the part 33a is rounded off. As shown by dotted lines in FIG. 4, the ends of the steel cable 32 cross at this round end face and are soldered into bores 35 in the free legs of the nipple 34. In its connecting web the nipple 34 has two further bores 36 into which may be soldered the ends of another nipple (not shown), and leading to an operating lever (not shown).

By pulling the nipple 34 in the axial direction the loop of the steel cable 32 embracing the magnetic body 2 and the brakeshoes 16 is thereby released.

The arrangement of a guiding or limiting element at the fixing position of the leaf springs brings about substantial functional and economic advantages. Since hitherto a comparatively large unused space was available in the zone of the mounting of the leaf spring, the element, acting as limiting member, may be made so strong, for example with overhanging arms of uniform-bending strength, that damage to the limiting member is reliably prevented even in the case of premature wear of a brakeshoe and subsequent multiple impact. In this way also damage to the brakedrum can be reliably avoided. Since no special tapped bores or screws are necessary for the limiting or guide element and, owing to the laterally extending arms, the brake linings may be about one-third shorter than hitherto, the whole arrangement is also much cheaper. The fact that the present brake linings, as compared with known brake linings, are now shorter by about one-third of their length should theoretically mean, by virtue of the chamfer of the brakeshoes relative to the brakedrum, a shortening of the expected life by one-ninth. This second power relationship results from the fact that, owing to the oblique position of the brakeshoes, the total volume of brake material removed is wedge-shaped, whereby, due to the shortening of the brakeshoe by one-third, only the point of the wedge, i.e., one-ninth of the usable braking material, is eliminated. However, practical tests have shown that, owing to the reliable prevention of damage to the drum and premature failure and wear of a single brakeshoe, the effective useful life amounts to at least double and probably to six times that of hitherto known brakes.

I claim:

1. In an electromagnetically releasable drum brake having an annular magnetic body with leaf springs secured thereto, magnetic armatures and brakeshoes on said springs and a brakedrum mounted concentrically around the body and springs with the leaf springs extending in the direction of the circumference of the magnetic body and carrying on at least one of their free ends brakeshoes and a magnetic armature cooperating with the magnetic body, wherein the improvement comprises means for limiting the movement of the brakeshoe, said means securing a leaf spring near its central portion to the periphery of the magnetic body and presenting a surface to form the stroke limiting means.

2. An electromagnetically releasable drum brake comprising an annular magnetic body, leaf springs, magnetic armatures, brakeshoes, mounting means, limiting means for limiting the movement of the brakeshoes and a brakedrum, wherein the said magnetic body is mounted within and concentrically to the said brakedrum, wherein the leaf springs extend in the direction of the circumference of the magnetic body and carry on their free ends each a magnetic armature and a brake shoe cooperating with the said magnetic body, wherein the mounting means fix the leaf springs centrally on the periphery of the magnetic body, and wherein the mounting means simultaneously form the stroke limiting means; said stroke limiting means being arranged in the region of the fastening means and bound by them to the magnet body.

3. A brake as set forth in claim 2, wherein the fixing element has a cylindrical upper surface the radius of curvature of which matches the inner radius of the curvature of the brakedrum.

4. A brake as set forth in claim 2, wherein the said fixing and stroke limiting means for each spring comprise an element with two diametrically opposite peripherally extending arms.

5. A brake as set forth in claim 4, wherein the said arms extend over the width of the magnetic body.

6. A brake as set forth in claim 4, wherein the said arms have the same uniform bending strength.

7. A brake as set forth in claim 4, wherein the arms extend partially over the magnetic armatures of the associated spring.

8. A brake as set forth in claim 7, wherein the part of the magnetic armature located under the arms is chamfered towards the fixing point of the leaf spring.

9. A brake as set forth in claim 2, comprising an auxiliary release device for mechanically releasing the brakeshoes in the form of a cable embracing the brakeshoes and arranged in circumferentially extending grooves thereby, wherein the release of the brakeshoes is effected by contracting the cable loop, and with the improvement that for guiding the cable along the surface of the element adjacent to the leaf spring there is provided a circumferentially extending groove therein.

10. A brake as set forth in claim 9 comprising a cable nipple, wherein the leg of the guide element forms a guide for the legs of the cable pull.

11. A brake as set forth in claim 10, wherein the cable nipple is U-shaped.